US012673788B2

(12) United States Patent
Dalloneau

(10) Patent No.: US 12,673,788 B2
(45) Date of Patent: Jul. 7, 2026

(54) REUSABLE ROCKET STAGE

(71) Applicant: ISAR AEROSPACE SE, Ottobrunn (DE)

(72) Inventor: Alexandre Dalloneau, Nanteau sur Lunain (FR)

(73) Assignee: ISAR AEROSPACE SE, Ottobrunn (DE)

( * ) Notice: Subject to any disclaimer, the term of this patent is extended or adjusted under 35 U.S.C. 154(b) by 0 days.

(21) Appl. No.: 18/698,465

(22) PCT Filed: Oct. 7, 2022

(86) PCT No.: PCT/EP2022/077888
§ 371 (c)(1),
(2) Date: Apr. 4, 2024

(87) PCT Pub. No.: WO2023/057606
PCT Pub. Date: Apr. 13, 2023

(65) Prior Publication Data
US 2024/0400228 A1     Dec. 5, 2024

(30) Foreign Application Priority Data

Oct. 7, 2021    (EP) ..................................... 21201522

(51) Int. Cl.
B64G 1/00        (2006.01)
B64B 1/02        (2006.01)
B64G 1/62        (2006.01)
(52) U.S. Cl.
CPC ............. B64G 1/006 (2023.08); B64G 1/623 (2023.08); B64B 1/02 (2013.01)
(58) Field of Classification Search
CPC .......... B64G 1/002; B64G 1/006; B64G 1/62; B64G 1/623
See application file for complete search history.

(56) References Cited

U.S. PATENT DOCUMENTS 3,508,724 A * 4/1970 Scher ..................... B64G 1/623
                                                                   244/113
4,504,031 A * 3/1985 Andrews .................. B64G 1/58
                                                                   244/113

(Continued)

FOREIGN PATENT DOCUMENTS

CN         110116823 A      8/2019
CN         113247313 A      8/2021
DE          10065385 A1 *  7/2002   ............... B64B 1/34

OTHER PUBLICATIONS

Propeller driven dirigible has steerable propellers on each end to aid maneuvering. (Year: 2002).*

(Continued)

*Primary Examiner* — Richard Green
*Assistant Examiner* — Nevena Aleksic
(74) *Attorney, Agent, or Firm* — Hoffmann & Baron, LLP

(57)        ABSTRACT

A rocket stage for a multistage space launch vehicle, wherein the rocket stage includes a main engine and is configured for stage separation from remaining parts of the space launch vehicle such that the rocket stage returns to the surface of the earth, wherein rocket stage includes an inflatable hull configured to retain lifting gas from a pressure tank, an inflation unit, a propulsion and steering unit configured to provide thrust and attitude control to the rocket stage, and a control unit configured to initiate inflation of the hull by controlling the inflation unit after the stage separation and to control the propulsion and steering unit to maneuver the rocket stage to a specified landing site on the surface of the earth.

16 Claims, 5 Drawing Sheets

(56) References Cited

U.S. PATENT DOCUMENTS

| | | | |
|---|---|---|---|
| 4,832,288 A | | 5/1989 | Kendall et al. |
| 5,826,826 A | | 10/1998 | Euskirchen et al. |
| 9,302,788 B2 * | | 4/2016 | Wan ...................... B64G 1/402 |
| 9,725,192 B2 * | | 8/2017 | Peyman .................... B64B 1/62 |
| 10,569,908 B1 * | | 2/2020 | Coyne ................... B64G 1/402 |
| 11,014,670 B2 * | | 5/2021 | Stephens, Jr. ............ B64B 1/40 |
| 2016/0280399 A1 | | 9/2016 | Tkach et al. |
| 2021/0229841 A1 * | | 7/2021 | O'Hanley .............. B64G 1/623 |

OTHER PUBLICATIONS

International Search Report and Written Opinion issued in International Application No. PCT/EP2022/077888 on Jan. 26, 2023.

* cited by examiner (A)

(B)

(C)

(D)

(E)

(I)

(II)

REUSABLE ROCKET STAGE

CROSS REFERENCE TO RELATED APPLICATIONS

The present application is the U.S. National Phase of PCT/EP2022/077888, filed on 7 Oct. 2022, which claims priority to European Patent Application No. 21201522.6, filed on 7 Oct. 2021, the entire contents of which are incorporated herein by reference.

BACKGROUND

Field

The invention relates to a rocket stage for a multistage space launch vehicle, and further to a method of guiding a rocket stage of a multistage space launch vehicle back to earth for reuse, and further to an airship module for being attached to a rocket stage.

Related Art

It is well known that a multistage space launch vehicle, or short "multistage rocket", has a far greater range and is thus better suited to reach remote orbits or leave the earth's gravitational field entirely than a single stage rocket. Typically, one or more lower stages provide for the initial thrust for liftoff to accelerate the vehicle to a certain speed and lift it to a certain altitude, thus having increased its potential and kinetic energy before one or more upper stages are ignited. Due to economic and environmental considerations, the idea of reusing at least the lowest stage (called the "first stage" as it is the stage to be ignited first) of such a space launch vehicle is of increasing interest within the space industry. To bring back the first stage of a space launch vehicle safely to earth without suffering any major damage such that it can be reused for another launch is a challenging task as at the time of stage separation, i.e., when the first stage is separated from the rest of the space launch vehicle, the space launch vehicle together with the first stage has reached a high altitude and velocity, typically far above the altitudes used by civil aviation such as in transatlantic or transpacific passenger flights.

The publicly well known launcher systems "Falcon 9" and "Falcon Heavy Launch Systems" from the American aerospace manufacturer "Space Exploration Technologies Corp." (short "SpaceX") are each using a propulsive landing system to return the first stage, such as side boosters. The propulsive landing system uses at least one thruster such as the main engine of the first stage to provide sufficient thrust to enable a landing of the first stage in upright position, similar to liftoff but in a reverse direction. The propulsive landing system, however, requires additional fuel at least for the landing phase of the rocket stage, thus hurting the payload capacity of the launcher system.

SUMMARY

It is thus an objective of the invention to improve the recovery of a rocket stage, in particular, the first stage of a space launch vehicle, i.e., to bring back a rocket stage of a space launch vehicle safely and preferably back to a specified location on the surface of the earth.

The objective of the invention is solved by the independent claims and further embodiments such as described by the dependent claims.

A first aspect of the invention relates to a rocket stage for a multistage space launch vehicle, wherein the rocket stage includes a main engine for providing thrust for liftoff of the space launch vehicle from the surface of the earth and wherein the rocket stage is configured for stage separation from the remaining parts of the space launch vehicle during the ascent after liftoff such that the space launch vehicle continues towards space and the rocket stage returns to the surface of the earth, characterized in that the rocket stage includes:

an inflatable hull for receiving and retaining lifting gas from a pressure tank attached to the rocket stage.

an inflation unit to perform the inflation of the hull with lifting gas, a propulsion- and steering unit to provide thrust and attitude control for the rocket stage while the hull is at least partially inflated, and a control unit to control the inflation unit and the propulsion- and steering unit, wherein the control unit is configured to initiate the inflation of the hull by controlling the inflation unit when a predefined condition after stage separation is fulfilled, for increasing the volume of the hull by filling the hull with lifting gas to generate aerostatic lift, and to control the propulsion- and steering unit to maneuver the rocket stage in a descent to a specified landing site on the surface of the earth while the hull is at least partially filled with lifting gas during the descent.

The space launch vehicle can be a transportation vehicle to carry payload such as satellites into an earth orbit for instance. Especially for repeated launches such as to add new satellites or replace old ones, or to carry out resupply launches for a space station such as the ISS (international space station), the reuse of as many parts as possible of the space launch vehicle, the first rocket stage in particular, significantly saves costs.

Since the rocket stage includes a main engine for providing thrust for liftoff, the rocket stage is typically a first stage, which is being ignited for the purpose of liftoff and to lift the one or more upper rocket stages to a certain altitude and accelerate the one or more upper stages to a certain velocity. It is irrelevant, however, whether the rocket stage in question is operated with a liquid propellant, solid propellant, or whether only one or more first stages in parallel are ignited to provide thrust for liftoff and some time after.

The lifting gas is preferably elected from one of hydrogen and helium, which is released from a pressure tank into the inflatable hull. Since the density of the lifting gas is smaller than the one of air at least at sea level and—depending on atmospheric conditions as well as the choice of the lifting gas—up to a certain altitude above sea level, the inflated hull containing at least partially the lifting gas leads to aerostatic lift caused by buoyant force. Such a concept is well known from airships such as the historic "Zeppelin", which includes a rigid framework within a hull made of fabric, as well as from so called "blimps", which equally exploit the aerostatic lift of a hull containing lifting gas (or containers including the lifting gas) but are lacking the rigid framework; instead, blimps rely on the tension of the hull caused by the pressure of the lifting gas inside the hull. Preferably, the hull being released from the rocket stage is also lacking any rigid framework inside such as an aluminum truss, but may include semi-rigid or other flexible elements such as polymer fibers to withstand a certain amount of tension forces, in particular, across opposing hull segments.

With the help of the buoyant force created by the hull filled with lifting gas the rocket stage is able to perform a slow descent or—if the volume of the hull filled with the lifting gas is high enough compared to the gross mass of the rocket stage including the hull—enter a cruise flight phase while maintaining constant altitude above sea level. To reach the specified location on the surface of the earth, in particular, a landing spot close to the launch site, the propulsion- and steering unit provides thrust for a translational force acting on the rocket stage, e.g., in order to build up and/or maintain a certain velocity with respect to earth, as well as attitude control at the level of rotational dynamics, e.g., for following a commanded heading angle, bank angle, and pitch angle. To this end, the propulsion- and steering unit can include one of:

force vector control provided by a steerable propulsion unit, thrust vector control by pure attitude control engines, e.g., attitude control thruster, aerodynamic control surfaces, or a combination of at least two of the above.

The control unit includes at least one hardware unit such as a computer including a processor, memory, and adequate input-output interfaces. Embodiments referring to the control unit may take the form of an entirely hardware embodiment, an entirely software embodiment, or an embodiment containing both hardware and software elements.

In particular, the control unit is configured to perform guidance and navigation tasks to return the rocket stage with the inflated hull to the specified target location on the surface of the earth, such as a landing site, an airfield, airport, load bed of a truck, or a load platform of a ship. This can include reactions on instructions from an air traffic controller, reactions on commands from a command and control ground station, or the operation of a TCAS system (Traffic collision avoidance system) to circumnavigate other air traffic within the local airspace and to avoid mid-air collisions with other aircraft.

The invention provides the advantage that a rocket stage, in particular, a first stage, of a space launch vehicle can be recovered after liftoff and safely guided back to a specified landing site for reusing the rocket stage for another launch of the space launch vehicle. The additional masses to be added by providing a system for guiding back the rocket stage to a specified landing site with the help of a buoyant force of lifting gas contained in a hull are typically lower than the additional masses required for a propulsive landing system as known from prior art, since very little or no additional fuel has to be carried with the rocket stage for descent and landing.

According to an embodiment of the invention, the predefined condition after stage separation for initiating the inflation of the hull is the drop of the velocity of the rocket stage with respect to earth below a predefined threshold.

According to another embodiment of the invention, the inflation unit includes an exchange unit for replacing the lifting gas with air from the surrounding atmosphere within the volume enclosed by the hull, wherein the control unit is configured to control the exchange unit to initiate and perform the replacement of lifting gas with air, such that with decreasing altitude of the rocket stage an increasing amount of lifting gas is being replaced with air.

This replacement of lifting gas with air from the surrounding atmosphere can be realized by implementing a well known buoyancy compensator to compensate for a higher air density of the surrounding atmosphere with decreasing altitude of the rocket stage, temperature changes, and other effects impacting the buoyant force of the lifting gas. In this way, the effect of higher buoyant force per unit of volume lifting gas with higher density of the surrounding air is compensated for.

According to another embodiment of the invention, the control unit is configured to release lifting gas from the volume enclosed by the hull and to retract the hull at least partially to shrink the volume enclosed by the hull, such that with decreasing altitude of the rocket stage the volume enclosed by the hull is decreased.

This embodiment is preferably applied for a hull designed as a blimp, meaning that the hull does not exhibit rigid support structure elements such as a truss, and instead relies on the pressure of the lifting gas to apply tension and hence a dimensionally stable shape of the hull. Retracting the hull can be done the same way, but in a reverse direction, as the prior release of the hull from a storage box containing the folded hull attached to or inside the rocket stage. In particular, if it is envisaged that the rocket stage during descent will not be required to be able to perform longer ascents, the loss of lifting gas into the surrounding atmosphere can be tolerated.

According to another embodiment of the invention, the propulsion- and steering unit includes at least one steerable propeller or ducted fan.

The at least one steerable propeller or ducted fan is preferably steerable around a lateral horizontal axis, i.e., in a vertical plane, to control a pitch motion of the rocket stage and thus a climb angle and altitude for longer time scales and/or steerable around a vertical axis for providing yaw control.

According to another embodiment of the invention, the at least one steerable propeller or ducted fan is connected to an electric motor, wherein the electric motor is electrically supplied by a battery attached to the rocket stage or by electricity from a solar panel arranged at the outer surface of the hull. Preferably, the solar panel has the shape of a solar panel film seamlessly contacting the outer surface of the hull.

According to another embodiment of the invention, the rocket stage includes a deceleration system to decrease the velocity of the rocket stage with respect to earth, wherein the control unit is configured to start the activation of the deceleration system during or after stage separation and before the inflation of the hull.

The deceleration system serves to decelerate the rocket stage from its initial velocity at stage separation or after a ballistic flight phase following stage separation. The deceleration is necessary to slow down the rocket stage to a speed which is safe for releasing and inflating the hull.

According to another embodiment of the invention, the deceleration system includes a device for generating aerodynamic drag, in particular, a parachute, and further in particular a parachute capable of surviving hypersonic or supersonic aerodynamic velocities. Equivalent to the parachute in the above and the following is the use of a ballute or the like.

According to another embodiment of the invention, the parachute is connected to the hull such that the aerodynamic drag of the parachute unfolds the hull, wherein the connection between the hull and the parachute is fixated with a resolvable release, wherein the control unit is configured to resolve the release, in particular, when the condition of reaching the predefined threshold is met.

Preferably, the parachute is connected to the hull with polymer cords or steel cables, such as ropes or cords made of ultra-high-molecular-weight Polyethylene- or Aramid-fibers to use the aerodynamic drag of the parachute as pulling force for releasing and unfolding the hull from a storage compartment attached to or integrated into the rocket stage, wherein the storage compartment serves to contain the folded hull.

According to another embodiment of the invention, the deceleration system is realized by retro-firing of the main engine of the rocket stage. This is preferably done either by operation of at least one dedicated reverse booster or by propulsive retro braking, the latter conducted by reigniting the main engine used for liftoff.

In addition or alternatively to the parachute, the deceleration system preferably includes steerable grid fins to develop aerodynamic drag and, in particular, attitude control for the rocket stage during its ballistic flight after stage separation.

According to another embodiment of the invention, the device for generating aerodynamic drag is attached to the rocket stage via a variable attachment point being movable or relocatable (=transferable) along a longitudinal axis of the rocket stage, wherein the control unit is configured to move or relocate the attachment point from its initial position at the rear part of the rocket stage with respect to the velocity vector towards a cross-sectional plane of the rocket stage including the center of gravity of the rocket stage before the hull is inflated, such that the body of the rocket stage is brought from an attitude with zero aerodynamic angle of attack with respect to a longitudinal axis of the rocket stage into a horizontal attitude before or while the hull is inflated.

The longitudinal axis of the rocket stage is roughly, in particular exactly, aligned (i.e., parallel to) with the kinematic velocity vector of the rocket stage at liftoff.

According to another embodiment of the invention, the device for generating aerodynamic drag is attached via at least two force transmitting devices, wherein a first one of the at least two force transmitting devices is attached to a rear end and a second one of the at least two force transmitting devices is attached to a front end of the rocket stage with respect to the velocity vector of the rocket stage before the inflation of the hull is initiated, wherein the force transmitting devices are able to provide only tensile strength between the device for generating aerodynamic drag and the body of the rocket stage, wherein at least the second one of the at least two force transmitting devices can be modified for length, wherein the control unit is configured to retract the second one of the at least two force transmitting devices such that the body of the rocket stage is brought from an attitude with zero aerodynamic angle of attack with respect to a longitudinal axis of the rocket stage into a horizontal attitude before the hull is inflated. The force transmitting devices are preferably cords, or seen equivalently to cords: ropes, strings, cables, or the like.

According to another embodiment of the invention, the fully inflated hull has the shape of a blimp-airship comprising aerodynamically stabilizing tail fins.

According to another embodiment of the invention, the aerostatic lift generated by the lifting gas within the volume enclosed by the at least partially inflated hull is at one point of time at least as high as the force of gravity acting on the rocket stage, wherein the control unit is configured to control the propulsion- and steering unit to perform a cruise flight with constant or increasing altitude above sea level before or during descent.

According to another embodiment of the invention, the aerostatic lift generated by the lifting gas within the volume enclosed by the at least partially inflated hull is smaller than the force of gravity acting on the rocket stage for at least the first 80% of the altitude descended by the rocket stage.

According to another embodiment of the invention, the control unit is configured to guide the rocket stage into a ballistic flight after stage separation by performing a main-engine-cutoff, and to guide into a deceleration phase after the ballistic flight, wherein the deceleration system is inactive during the ballistic flight and active during the deceleration phase.

According to another embodiment of the invention, the pressure tank is arranged in the upper part of the rocket stage with respect to the attitude of the rocket stage during liftoff, wherein the rocket stage includes a reverse unit, and the reverse unit is configured to rotate the rocket stage around a lateral axis of the rocket stage during the ballistic phase, such that the main engine is located at the front of the rocket stage with respect to the velocity vector and the pressure tank is located in the rear part of the rocket stage with respect to the velocity vector after being rotated by the reverse unit.

Another aspect of the invention relates to a method of guiding a rocket stage of a multistage space launch vehicle back to earth for reuse, wherein the rocket stage provides thrust with a main engine for liftoff of the space launch vehicle from the surface of the earth and wherein the rocket stage is separated from the remaining parts of the space launch vehicle during ascent after liftoff such that the space launch vehicle continues towards space and the rocket stage returns to the surface of the earth, characterized in that a control unit initiates an inflation of an inflatable hull connected to the rocket stage when a predefined condition after stage separation is fulfilled such that the hull is receiving and retaining lifting gas from a pressure tank attached to the rocket stage for increasing the volume of the hull with lifting gas to generate aerostatic lift, and to control a propulsion- and steering unit to maneuver the rocket stage to a specified landing site on the surface of the earth in a descent, wherein the propulsion- and steering unit provides thrust and attitude control while the hull is at least partially inflated and wherein the hull is at least partially filled with the lifting gas during the descent.

Advantages and preferred embodiments of the invented method can be derived by mutatis mutandis applying the features of the specification shown in connection with the inventive rocket stage.

Another aspect of the invention relates to an airship-module with the purpose of being attached to a rocket stage, including a pressure tank for containing lifting gas, an inflation unit, a control unit, and a compartment containing an inflatable hull, wherein the inflatable hull is configured to receive and retain lifting gas from the pressure tank, and the inflation unit is configured to perform the inflation of the hull with lifting gas, wherein the airship-module further includes a propulsion- and steering unit to provide thrust and attitude control for the rocket stage while the hull is at least partially inflated, and wherein the control unit is configured to control the inflation unit and the propulsion- and steering unit.

Advantages and preferred embodiments of the invented airship-module can be derived by mutatis mutandis applying the features of the specification shown in connection with the inventive rocket stage.

The description herein, in particular with regard to the drawings below, is presented for purposes of illustration and understanding, and is not intended to be exhaustive or limited to the invention in the form disclosed. Various modifications and variations will be apparent to those of ordinary skill in the art. The embodiments, in particular with regard to the drawings, are chosen and described in order to best explain the principles of the invention, the practical application, and to enable others of ordinary skill in the art to understand the invention for various embodiments with various modifications as suited to a particular contemplated use.

The figures are drafted schematically and not drawn to scale.

DETAILED DESCRIPTION

Figure 1:
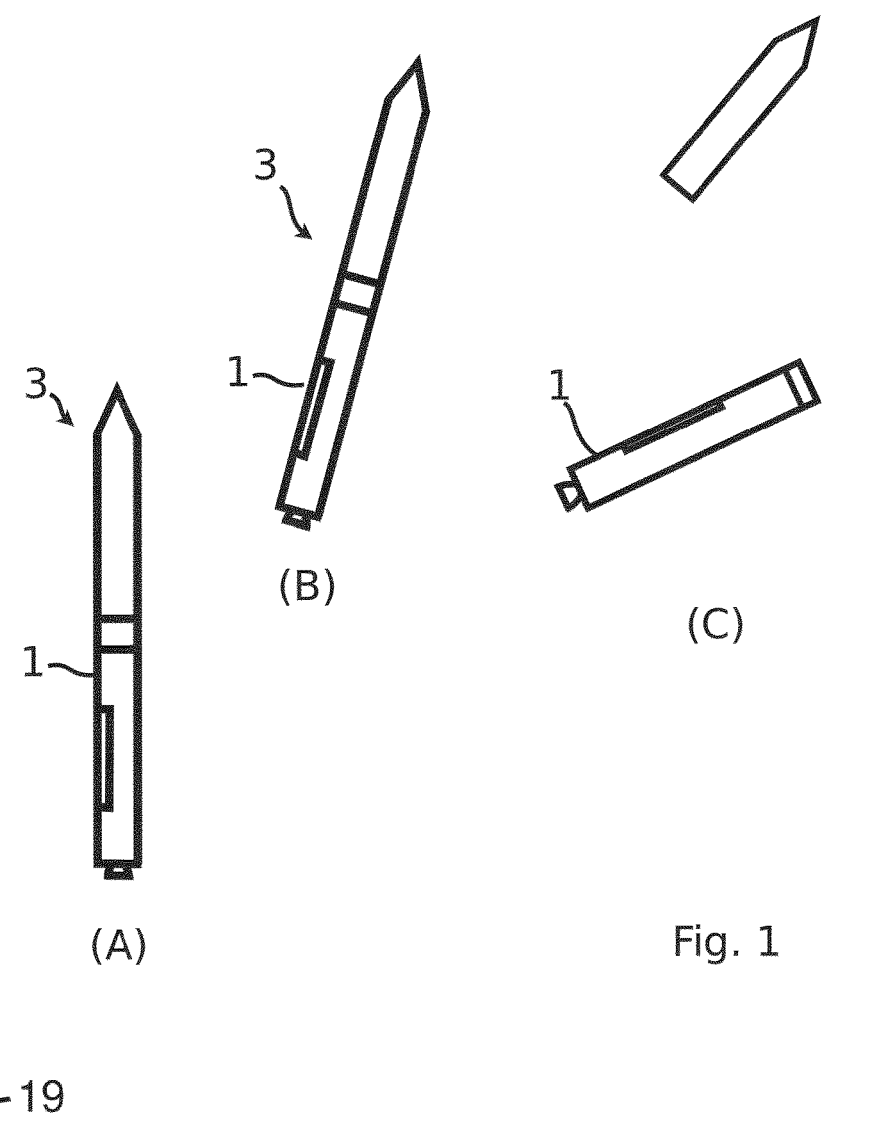
FIG. 1 shows various phases during and after liftoff of the rocket stage.

FIG. 1 shows the space launch vehicle 3 from liftoff, shown at state (A), up to stage separation in phase (C). During liftoff (A), the lower and thus first rocket stage 1 is firmly connected to the upper stage of the two-stage space launch vehicle 3. The rocket stage 1 is the first stage to boost the space launch vehicle 3 to a certain altitude and speed above ground. To this end, the rocket stage 1 includes a main engine 5 (see FIG. 7) for providing thrust for liftoff of the space launch vehicle 3 from the surface. Around five minutes after liftoff (A), the space launch vehicle reached seventy kilometers in altitude and is tilted away from the vertical liftoff position in preparation to enter an orbit around the earth, shown in phase (B) in FIG. 1. Stage separation (C) follows such that the rocket stage 1 is separated from the upper parts of the space launch vehicle 3 during the ascent after liftoff. The space launch vehicle 3 with the payload continues towards its target orbit around earth by igniting its upper stage, while the rocket stage 1 performs a reentry maneuver in a ballistic flight and returns to the surface of the earth as explained with the help of various embodiments depicted in FIG. 2 to FIG. 7.

Figure 2:
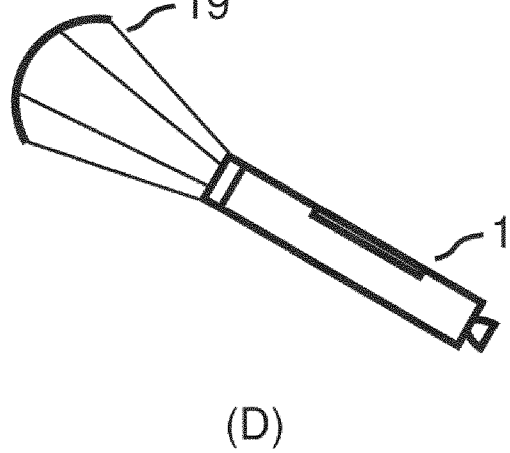
FIG. 2 shows a deceleration phase of the rocket stage and an inflation phase of the hull according to an embodiment of the invention.
Figure 2:
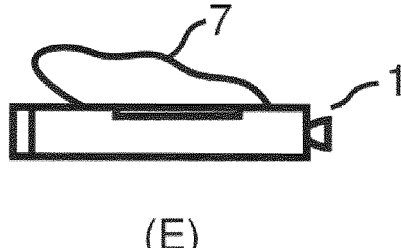

FIG. 2 shows two example phases following the stage separation (C) of FIG. 1. First is a deceleration phase (D) being initiated after conducting a ballistic phase. The rocket stage 1 is equipped with a deceleration system 19 with a parachute to decrease the velocity of the rocket stage 1 with respect to earth. The control unit 15 activates the deceleration system 19 during or after stage separation and before the inflation of the hull 7 in phase (E). While inflating the hull 7 with lifting gas the parachute is jettisoned. The inflation pressure together with the aerodynamic drag of the parachute before jettisoning helps to unfold the hull 7 and to release it from its storage compartment arranged in the inside of the rocket stage 1. The inflated hull 7 brings the rocket stage 1 into a horizontal position due to the drag force above the center of gravity of the rocket stage 1 leading to a pitch-up moment. The hull continues to be inflated after phase (E), leading to a blimp configuration of the hull 7 with the rocket stage 1 hanging below. More details about the blimp shaped configuration of the hull 7 are given with regard to FIG. 6.

Figure 3:
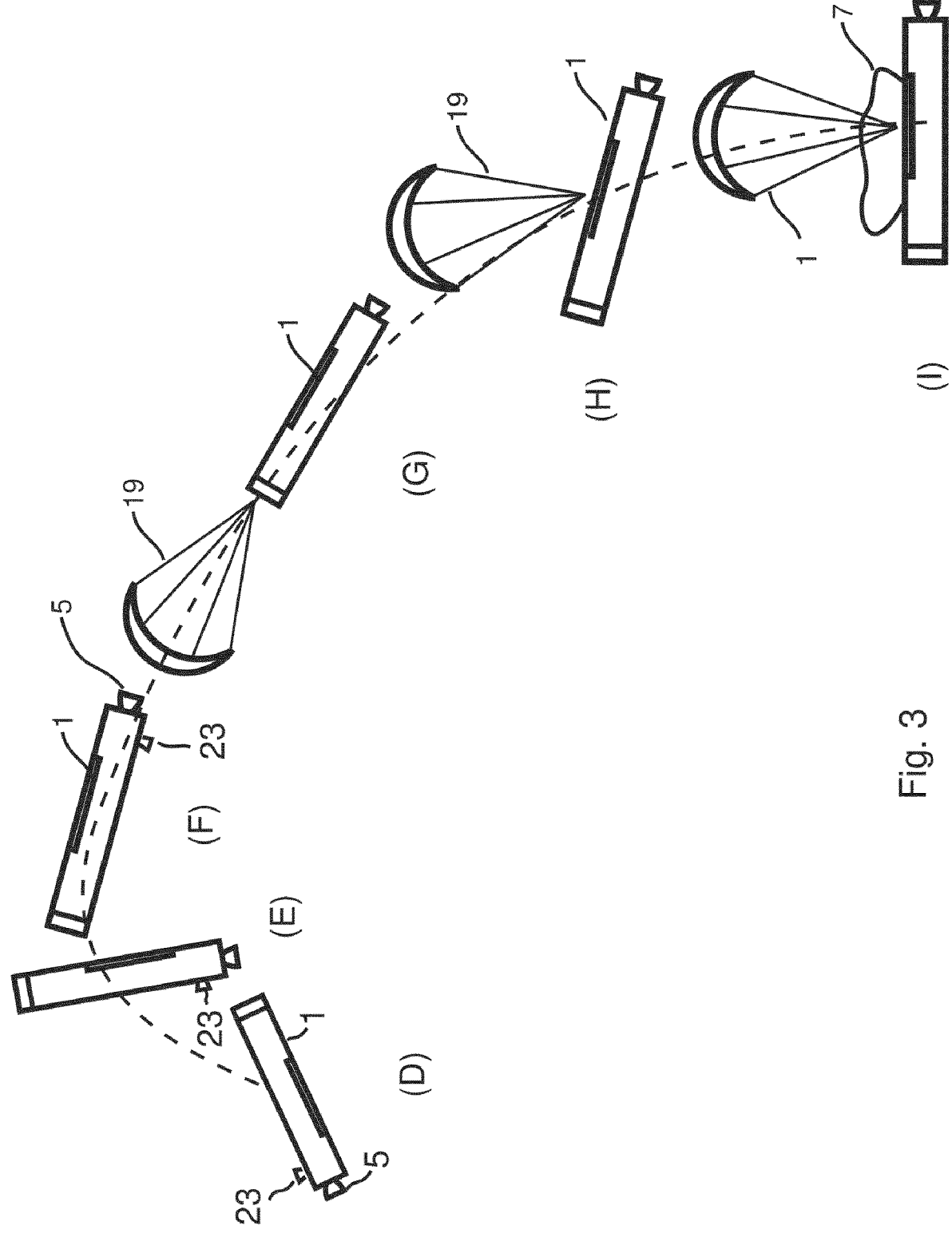
FIG. 3 shows a specific procedure after stage separation according to an embodiment of the invention.

FIG. 3 shows an alternative procedure to the one outlined in FIG. 2, following phase (C) of FIG. 1. In FIG. 3, the trajectory of the center of gravity of the rocket stage 1 is drawn as a dashed curve. The control unit 15 guides the rocket stage 1 into a ballistic flight after stage separation (phase (C) in FIG. 1) by performing a main-engine-cutoff. Phase (D) in FIG. 3 differs from phase (C) of FIG. 1 in that a reverse unit 23, which includes an attitude control thruster, is activated, before the rocket stage is guided into a deceleration phase after the ballistic flight. During this ballistic flight, the deceleration system 19 is still inactive and only active during the deceleration phase. Furthermore, during the ballistic flight, the reverse unit 23 provides thrust outside the center of gravity of the rocket stage 1 such that a moment is exercised on the rocket stage 1, causing the rocket stage 1 to rotate around a lateral axis. While in phase (D) of FIG. 3 the rotation is initiated, the rocket stage 1 is rotated in the shortest possible direction of rotation to reach via the rotation (cf. phase (E)) a reverse orientation. While during liftoff the main engine 5 is oriented at the rear part of the rocket stage 1 with respect to the velocity vector of the rocket stage 1, the main engine 5 is, after the rotation being performed by the reverse unit 23 is finished, oriented towards the front of the rocket stage 1 with respect to the velocity vector of the rocket stage 1. The reverse unit 23 rotates the rocket stage 1 so far that the aerodynamic angle of attack is zero or close to zero with respect to a longitudinal axis of the body of the rocket stage 1. If the pressure tank 9 containing inflammable lifting gas, such as hydrogen, is arranged in the upper part of the rocket stage 1 with respect to the attitude of the rocket stage 1 during liftoff, the pressure tank 9 is located in the rear part of the rocket stage 1 during phase (F), which is a ballistic flight for a longer period of time for a reentry into the atmosphere of the earth, in which the rocket stage 1 is affected by friction and high dynamic pressure of the surrounding air with respect to the velocity vector after being rotated by the reverse unit 23. In this way, the pressure tank 9 is far less exposed to the high temperatures at the front of the rocket stage 1, where the effect of the dynamic pressure and heat generation is prevalent the most. After a continued flight period for reentry into the atmosphere, the deceleration system 19 including a parachute capable of surviving supersonic airflow is unfolded to decrease the velocity of the rocket stage 1 with respect to earth. The parachute generates aerodynamic drag and is attached to the rocket stage 1 at a movable attachment point, wherein the attachment point is being movable along a longitudinal axis of the rocket stage 1. Initially, the attachment point is located at the rear end of the rocket stage 1 with respect to the velocity vector of the rocket stage 1 (cf. phase (G)), until a certain predefined velocity is reached. Phase (H) is initiated only in a subsonic flight regime for maintaining predictable aerodynamic stability properties of the body of the rocket stage 1. During this phase (H), the attachment point is moved towards the center of the rocket stage 1 and thus further towards the position of the center of gravity of the rocket stage 1, thus rotating the body of the rocket stage 1 increasingly towards a horizontal attitude. The body of the rocket stage 1 in this maneuver is brought from an attitude with close to zero aerodynamic angle of attack with respect to a longitudinal axis of the rocket stage 1 into a horizontal attitude before the hull 7 is inflated in an altitude of 20 km above mean sea level (cf. phase (I)). Hence, the hull 7 hardly experiences any longitudinal airflow when being inflated, but only a vertical stream supporting the opening of the hull out of its storage compartment located in or on the surface of the body of the rocket stage 1.

Figure 4:
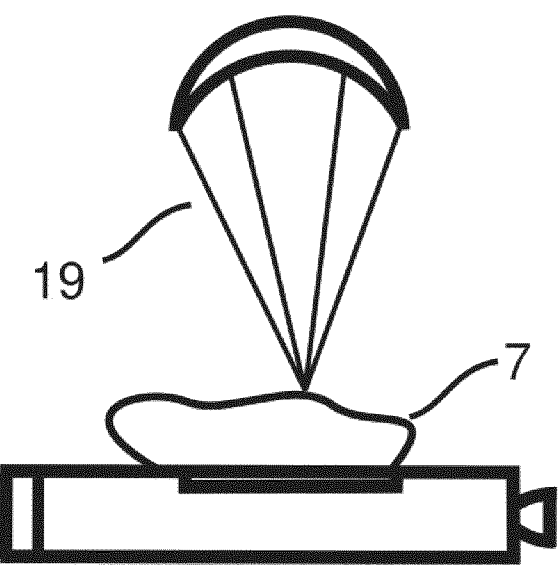
FIG. 4 shows a specific connection between a parachute and the inflatable hull of the rocket stage according to an embodiment of the invention.

FIG. 4 shows an alternative configuration to the one depicted in phase (I) of FIG. 3. While in the latter the hull 7 is extracted form its storage compartment without affecting the cords of the parachute 19 and the parachute 19 is jettisoned at a certain stage of extracting and inflating the hull 7, FIG. 4 shows an alternative method to this in that the parachute 19 actively helps to extract the hull 7 from its storage compartment via a pulling force generated by the aerodynamic drag of the parachute, which is bigger than the aerodynamic drag of the body of the rocket stage 1. However, also in this embodiment, the parachute 19 will be jettisoned at a certain stage of extracting and inflating the hull 7.

Figure 5:
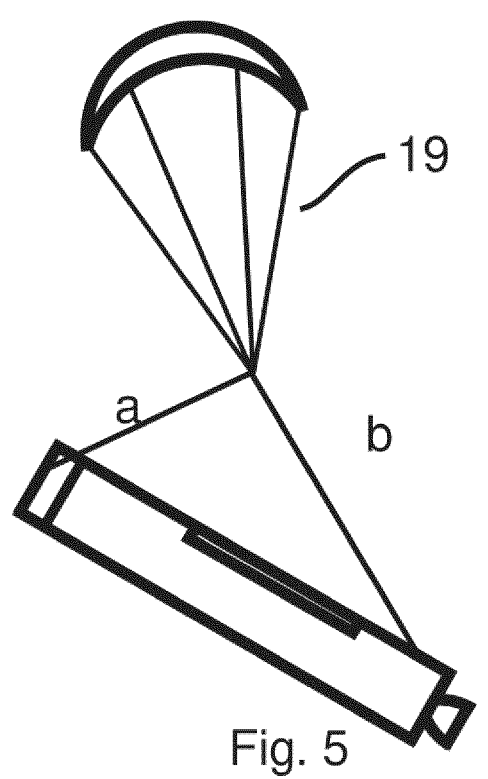
FIG. 5 shows a specific connection between the parachute and the rocket stage with cords according to an embodiment of the invention.

FIG. 5 shows an alternative to the movable attachment point of the parachute 19 as explained in connection with FIG. 3: In the embodiment of FIG. 5, the parachute 19 is attached via two Aramid cords attached to a rear end and a front end of the rocket stage 1. In FIG. 5, a rear cord with static length 'a' and a front cord with variable length 'b' are shown. During phase (G) in FIG. 3, length b is equal to or longer than the sum of length a and the length of the body of the rocket stage 1 such that the parachute 19 is dragged behind the body of the rocket stage 1, without the cord with length b affecting the position of the parachute 19 relative to the body of the rocket stage 1. Length b is then (cf. phase (H) in FIG. 3) shortened until a and b are equally long and the body of the rocket stage 1 is brought into a horizontal attitude and the cords with lengths a and b roughly bear the same load of the gravitational force of the body of the rocket stage 1 before the hull 7 is inflated.

Figures 6, 7:
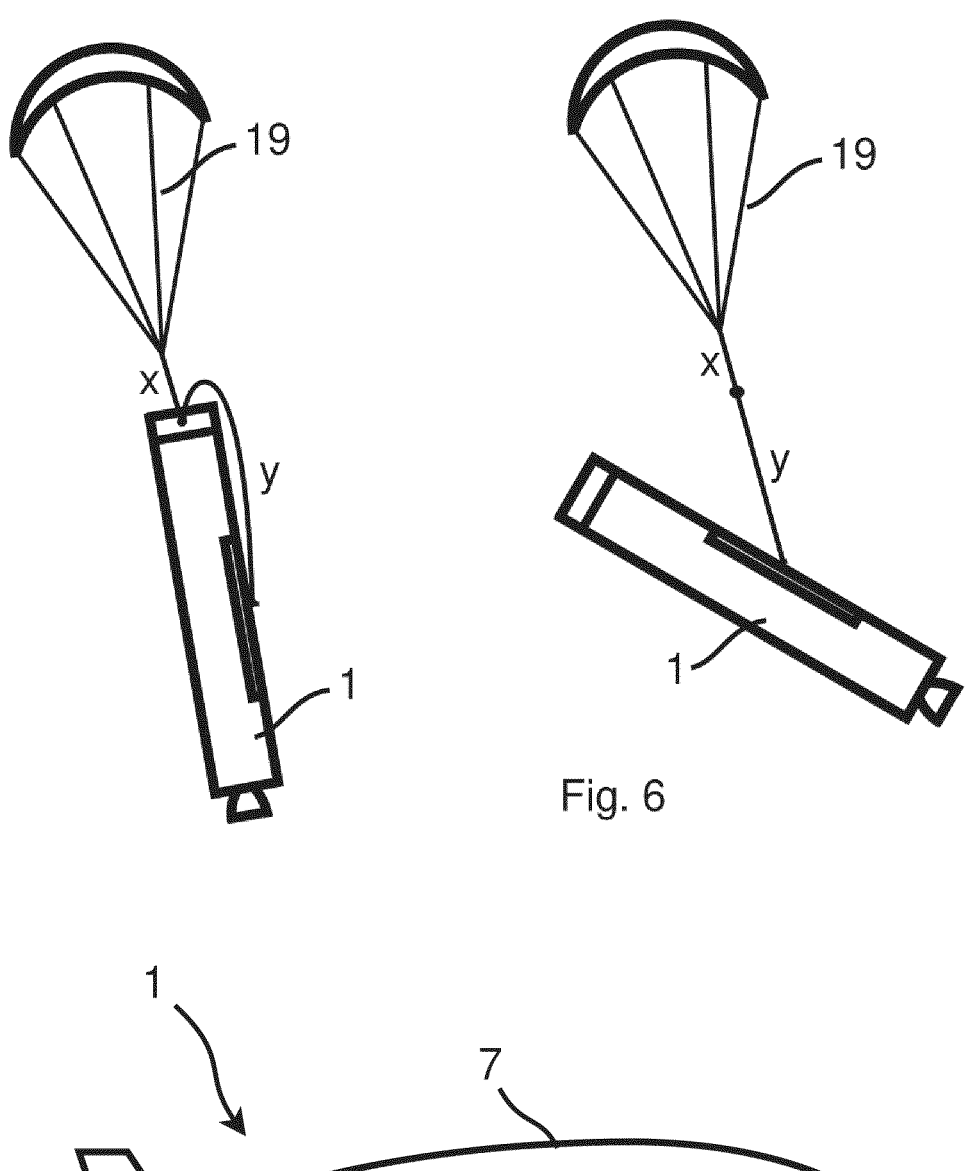
FIG. 6 shows a specific connection between the parachute and the rocket stage with cords according to an embodiment of the invention.
FIG. 7 shows the rocket stage together with the inflated hull according to an embodiment of the invention.

FIG. 6 shows an alternative to the variable attachment point of the parachute 19 as explained with regard to FIG. 3, which also serves as an alternative to the solution explained in relation to FIG. 5. In this alternative, such as the one depicted in FIG. 6, the position of the effective attachment point of the parachute 19 to the rocket stage 1 is variable in that one cord with a first attachment point and a second attachment point is used. The first attachment point is located at an end of the rocket stage 1 and is logically separating the cord into an upper part x and a lower part y, but can be released from the rocket stage 1. The second attachment point of the cord is located in or near a sectional plane of the rocket stage 1 containing the center of gravity of the body of the rocket stage 1. Before the release of the first attachment point, only the upper part x of the cord is under tension, and the lower part y is loosely stored inside or at the surface of the rocket stage 1. After releasing the first attachment point, the cord is then brought under tension over its entire length including both logical parts x and y. In FIG. 6, the parachute 19 is applying a force (which is originally caused by its aerodynamic drag) via the cord to the body of the rocket stage 1. Shortly after releasing the first attachment point, the aerodynamic drag applying a force against the force of gravity of the rocket stage 1 is putting the cord under tension over its entire length, such that the longitudinal axis of the body of the rocket stage 1 is rotated into a horizontal attitude over time due the position of the second attachment point. Releasing the first attachment point can be done by activating a release mechanism at the rocket stage 1, for instance, pyrotechnically.

Figure 8:
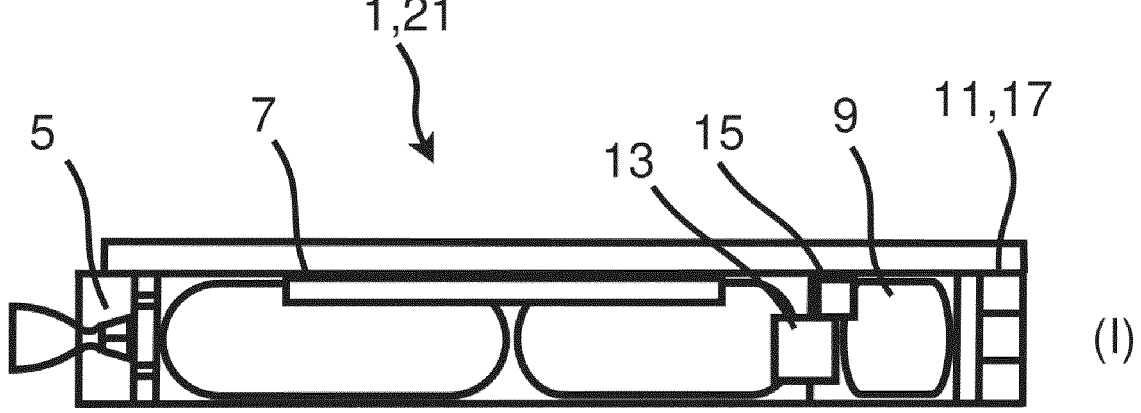
FIG. 8 shows components of the rocket stage with an attached airship-module according to an embodiment of the invention.
Figure 8:
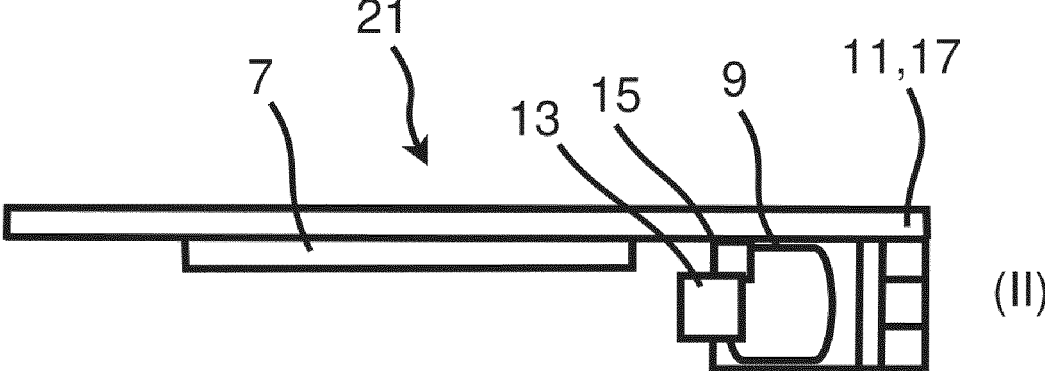

FIG. 7 shows the rocket stage 1 with the inflatable hull 7 fully inflated with lifting gas from a pressure tank 9 attached to the rocket stage 1—see FIG. 8 for more details. One propulsion- and steering unit 13 is attached to the left side and one to the right side of the rocket stage 1. It provides thrust and attitude control for the rocket stage 1 while the hull 7 is at least partially inflated. Being fully inflated, the hull 7 has the shape of a blimp-airship including aerodynamically stabilizing tail fins. Each of the propulsion- and steering units 13 includes one ducted fan which can be tilted around a lateral axis to provide a pitch moment. Yaw control is preformed by rotating the upper and lower vertical tail fin around a vertical axis. The ducted fan is powered by an electric motor, and the electric motor in turn is electrically supplied by a battery attached to the rocket stage 1. The hull 7 itself has a rigid connection to the body of the rocket stage 1, in particular, lacking any lose cords or the like, such that the rocket stage 1 in its function as a gondola of a blimp is connected without any degree of freedom to allow a motion between the hull 7 and the body of the rocket stage 1. The body of the rocket stage 1 is thus connected to the fully inflated hull 7 such that a relative motion between the hull 7 and the body of the rocket stage 1 is prevented. Furthermore, the body of the rocket stage 1 is contacting the hull 7, i.e., the hull 7 and the body of the rocket stage 1 are contacting each other without any gap between them.

FIG. 8 shows a sectional view through the rocket stage 1, with a mounted airship-module 21 but without showing the hull 7 in section (I) of FIG. 8, whereas in section (II) of FIG. 8 the attachable airship-module 21 alone is shown. The airship-module 21 serves to equip existing lower rocket stages 1 with reentry and recovery capabilities by refitting the latter with such an airship-module 21 as shown in section (II). To this end, the attachable airship-module 21 includes a pressure tank 9 for containing lifting gas, an inflation unit 11, a control unit 15, and a compartment containing an inflatable hull 7, wherein the inflatable hull 7 is configured to receive and retain lifting gas from the pressure tank 9, and the inflation unit 11 is configured to perform the inflation of the hull 7 with lifting gas, wherein the airship-module 21 further includes a propulsion- and steering unit 13 to provide thrust and attitude control for the rocket stage 1 while the hull 7 is at least partially inflated, and wherein the control unit 15 is configured to control the inflation unit 11 and the propulsion- and steering unit 13. The inflation unit 11 with a valve serves to perform the inflation of the hull 7 with lifting gas. Connected to the inflation unit 11 is the exchange unit 17 for replacing the lifting gas with air from the surrounding atmosphere within the volume enclosed by the hull 7, wherein the control unit 15 is configured to control the exchange unit 17 to initiate and perform the replacement of lifting gas with air, such that with decreasing altitude of the rocket stage 1 an increasing amount of lifting gas is being replaced with air. The control unit 15 also serves to control the inflation unit 11 and the propulsion- and steering unit 13 (see FIG. 3). It also initiates the inflation of the hull 7 by controlling the inflation unit 11 when a predefined condition after stage separation is fulfilled, for increasing the volume of the hull 7 by filling the hull 7 with the lifting gas to generate aerostatic lift, and to control the propulsion- and steering unit 13 to maneuver the rocket stage 1 in a descent to a specified landing site on the surface of the earth while the hull 7 is at least partially filled with the lifting gas during the descent, called the ferry-back-flight. Further components of the rocket stage 1 are explained with the help of section (I) of FIG. 8. The main engine 5 thereof includes at least one liquid propellant thruster at its lower end.

REFERENCE NUMERALS

1 Rocket stage
3 Space launch vehicle
5 Main engine
7 Inflatable hull
9 Pressure tank
11 Inflation unit
13 Propulsion- and steering unit
15 Control unit
17 Exchange unit
19 Deceleration system
21 Airship-module
23 Reverse unit

The invention claimed is:

1. A rocket stage for a multistage space launch vehicle, wherein the rocket stage comprises a main engine to provide thrust for liftoff of the space launch vehicle from the surface of the earth and wherein the rocket stage is configured for stage separation from remaining parts of the space launch vehicle during ascent after the liftoff such that the space launch vehicle continues towards space and the rocket stage returns to the surface of the earth, the rocket stage comprising:

a pressure tank attached to the rocket stage;
an inflatable hull configured to receive and retain lifting gas from the pressure tank;
an inflation unit configured to perform inflation of the hull with the lifting gas;
a propulsion and steering unit configured to provide thrust and attitude control for the rocket stage while the hull is at least partially inflated; and
a control unit configured to control the inflation unit and the propulsion and steering unit, wherein the control unit is configured to:
initiate the inflation of the hull by controlling the inflation unit when a predefined condition after the stage separation is fulfilled, the inflation increasing a volume of the hull by filling the hull with the lifting gas to generate aerostatic lift; and
control the propulsion and steering unit to maneuver the rocket stage in a descent to a specified landing site on the surface of the earth while the hull is at least partially filled with the lifting gas during the descent, wherein the rocket stage is in a horizontal attitude while suspended below the inflated hull during a phase of descent, wherein the hull that is fully inflated has the shape of a blimp-airship comprising aerodynamically stabilizing tail fins, wherein the rocket stage comprises a deceleration system configured to decrease velocity of the rocket stage with respect to the earth, and wherein the control unit is further configured to start activation of the deceleration system during or after the stage separation and before the inflation of the hull.

2. The rocket stage according to claim 1, wherein the inflation unit comprises an exchange unit configured to replace the lifting gas with air from surrounding atmosphere within the volume enclosed by the hull, wherein the control unit is further configured to control the exchange unit to initiate and perform replacement of the lifting gas with air, such that with decreasing altitude of the rocket stage an increasing amount of the lifting gas is replaced with the air.

3. The rocket stage according to claim 2, wherein the control unit is configured to release the lifting gas from the volume enclosed by the hull and to retract the hull at least partially so as to shrink the volume enclosed by the hull, such that with the decreasing altitude of the rocket stage the volume enclosed by the hull is decreased.

4. The rocket stage according to claim 1, wherein the propulsion and steering unit comprises at least one steerable propeller or ducted fan.

5. The rocket stage according to claim 1, wherein the deceleration system comprises a device configured to generate aerodynamic drag.

6. The rocket stage according to claim 5, wherein the device configured to generate the aerodynamic drag is attached to the rocket stage at a variable attachment point, the attachment point being movable or relocatable along a longitudinal axis of the rocket stage, wherein the control unit is further configured to move or relocate the attachment point from an initial position at a rear part of the rocket stage with respect to a velocity vector towards a cross-sectional plane of the rocket stage comprising a center of gravity of the rocket stage before the hull is inflated, such that a body of the rocket stage is brought from an attitude with zero aerodynamic angle of attack with respect to the longitudinal axis of the rocket stage into a horizontal attitude before or while the hull is inflated.

7. The rocket stage according to claim 5, wherein the device configured to generate the aerodynamic drag is attached via at least two force transmitting devices, wherein a first device of the at least two force transmitting devices is attached to a rear end of the rocket stage and a second device of the at least two force transmitting devices is attached to a front end of the rocket stage with respect to a velocity vector of the rocket stage when the inflation of the hull is initiated, wherein the at least two force transmitting devices are able to provide tensile strength between the device configured to generate the aerodynamic drag and a body of the rocket stage, wherein at least the second device is capable of being modified for length, wherein the control unit is further configured to retract the second device such that the body of the rocket stage is brought from an attitude with zero aerodynamic angle of attack with respect to a longitudinal axis of the rocket stage into a horizontal attitude before the hull is inflated.

8. The rocket stage according to claim 1, wherein the aerostatic lift generated by the lifting gas within the volume enclosed by the hull that is at least partially inflated is at one point of time at least as high as a force of gravity acting on the rocket stage, wherein the control unit is further configured to control the propulsion and steering unit to perform a cruise flight with constant or increasing altitude above sea level before or during descent.

9. The rocket stage according to claim 1, wherein the aerostatic lift generated by the lifting gas within the volume enclosed by the hull that is at least partially inflated is smaller than a force of gravity acting on the rocket stage for at least first 80% of the altitude descended by the rocket stage.

10. The rocket stage according to claim 1, wherein the control unit is further configured to guide the rocket stage into a ballistic flight after the stage separation by performing a main-engine-cutoff, and to guide the rocket stage into a deceleration phase after the ballistic flight, wherein the deceleration system is inactive during the ballistic flight and active during the deceleration phase.

11. The rocket stage according to claim 10, wherein the pressure tank is arranged in an upper part of the rocket stage with respect to the attitude of the rocket stage during liftoff, wherein the rocket stage comprises a reverse unit configured to rotate the rocket stage around a lateral axis of the rocket stage during the ballistic phase, such that the main engine is located at a front of the rocket stage with respect to a velocity vector of the rocket stage and the pressure tank is located in a rear part of the rocket stage with respect to the velocity vector after being rotated by the reverse unit.

12. A method of guiding a rocket stage of a multistage space launch vehicle back to earth for reuse, wherein the rocket stage provides thrust with a main engine for liftoff of the space launch vehicle from the surface of the earth and wherein the rocket stage is separated from remaining parts of the space launch vehicle during ascent after the liftoff such that the space launch vehicle continues towards space and the rocket stage returns to the surface of the earth, the method comprising:

initiating, via a control unit, an inflation of an inflatable hull connected to the rocket stage when a predefined condition after stage separation is fulfilled such that the hull is receiving and retaining lifting gas from a pressure tank attached to the rocket stage for increasing the volume of the hull with the lifting gas to generate aerostatic lift; and controlling, via the control unit, a propulsion and steering unit to maneuver the rocket stage to a specified landing site on the surface of the earth in a descent, wherein the propulsion and steering unit provides thrust and attitude control while the hull is at least partially inflated and wherein the hull is at least partially filled with the lifting gas during the descent, wherein the rocket stage is in a horizontal attitude while suspended below the inflated hull during a phase of descent, wherein the hull that is fully inflated has the shape of a blimp-airship comprising aerodynamically stabilizing tail fins, wherein the rocket stage comprises a deceleration system configured to decrease velocity of the rocket stage with respect to the earth, and wherein the control unit is further configured to start activation of the deceleration system during or after the stage separation and before the inflation of the hull.

13. The rocket stage according to claim 5, wherein the device configured to generate the aerodynamic drag is a parachute.

14. The rocket stage according to claim 13, wherein the parachute is attached to the rocket stage at a movable attachment point, the attachment point being movable along a longitudinal axis of the rocket stage.

15. The rocket stage according to claim 13, wherein the parachute is attached directly to the hull.

16. A rocket stage for a multistage space launch vehicle, wherein the rocket stage comprises a main engine to provide thrust for liftoff of the space launch vehicle from the surface of the earth and wherein the rocket stage is configured for stage separation from remaining parts of the space launch vehicle during ascent after the liftoff such that the space launch vehicle continues towards space and the rocket stage returns to the surface of the earth, the rocket stage comprising:

an inflatable hull configured to receive and retain lifting gas from a pressure tank attached to the rocket stage;

an inflation unit configured to perform inflation of the hull with the lifting gas;

a propulsion and steering unit configured to provide thrust and attitude control for the rocket stage while the hull is at least partially inflated; and a control unit configured to control the inflation unit and the propulsion and steering unit, wherein the control unit is configured to:

initiate the inflation of the hull by controlling the inflation unit when a predefined condition after the stage separation is fulfilled, the inflation increasing a volume of the hull by filling the hull with the lifting gas to generate aerostatic lift; and control the propulsion and steering unit to maneuver the rocket stage in a descent to a specified landing site on the surface of the earth while the hull is at least partially filled with the lifting gas during the descent;

wherein the rocket stage comprises a deceleration system configured to decrease velocity of the rocket stage with respect to the earth, and wherein the control unit is further configured to start activation of the deceleration system during or after the stage separation and before the inflation of the hull;

wherein the deceleration system comprises a device configured to generate aerodynamic drag;

wherein the device configured to generate the aerodynamic drag is a parachute; and wherein the parachute is attached to the rocket stage at a movable attachment point, the attachment point being movable along a longitudinal axis of the rocket stage.

* * * * *